United States Patent
Li et al.

(10) Patent No.: US 10,489,367 B2
(45) Date of Patent: Nov. 26, 2019

(54) GENERATING AN INDEX FOR A TABLE IN A DATABASE BACKGROUND

(71) Applicant: International Business Machines Corporation, Armonk, NY (US)

(72) Inventors: Yue Li, Beijing (CN); Zhao Wei Li, Beijing (CN); Dong Jie Wei, Beijing (CN); Ling Xu, Hangzhou (CN)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 14/886,235

(22) Filed: Oct. 19, 2015

(65) Prior Publication Data

US 2016/0147751 A1 May 26, 2016

(30) Foreign Application Priority Data

Nov. 25, 2014 (CN) .......................... 2014 1 0690310

(51) Int. Cl.
*G06F 16/00* (2019.01)
*G06F 16/22* (2019.01)

(52) U.S. Cl.
CPC .......... *G06F 16/2255* (2019.01); *G06F 16/22* (2019.01); *G06F 16/2228* (2019.01); *G06F 16/2272* (2019.01)

(58) Field of Classification Search
CPC .................................................. G06F 17/3048
See application file for complete search history.

(56) References Cited

U.S. PATENT DOCUMENTS 5,511,190 A 4/1996 Sharma et al.
6,826,557 B1 * 11/2004 Carter ............... G06F 17/30457

(Continued)

FOREIGN PATENT DOCUMENTS

CN 101593191 A 12/2009
CN 103678619 A 3/2014

(Continued)

OTHER PUBLICATIONS

Hsueh et al., "Caching Support for Skyline Query Processing with Partially Ordered Domains", IEEE Transactions on Knowledge and Data Engineering, vol. 26, No. 11, Nov. 2014, pp. 2649-2661.

(Continued)

*Primary Examiner* — Etienne P Leroux
*Assistant Examiner* — Farhad Agharahimi
(74) *Attorney, Agent, or Firm* — Kenneth Han

(57) ABSTRACT

Embodiments of the present invention disclose a method, computer program product, and system for generating and manipulating an index for a table in a database. A query statement is received, the table of lines are searched, a result list is generated, and an index for the query statement is generated, wherein the index comprises information associated with the result list and the query condition. The query condition and the identifier of the table is extracted from the query statement, where the index is generated based on the query condition, the identifier of the table, and the result list. A hash value of the identifier of the table and the query condition is obtained, an association between the hash value and the result list to build the index is generated, and in response to a line of the plurality of lines in the table being modified, the index identified as invalid.

18 Claims, 8 Drawing Sheets

(56) References Cited

U.S. PATENT DOCUMENTS

| | | | |
|---|---|---|---|
| 6,952,741 B1 * | 10/2005 | Bartlett | G06F 12/0815 |
| | | | 709/245 |
| 8,321,420 B1 | 11/2012 | Sinclair et al. | |
| 8,468,150 B2 | 6/2013 | Attaluri et al. | |
| 8,515,945 B2 | 8/2013 | Pendap et al. | |
| 8,583,657 B2 | 11/2013 | Shukla | |
| 8,626,729 B2 | 1/2014 | Whitehead et al. | |
| 9,305,056 B1 * | 4/2016 | Gupta | G06F 17/3048 |
| 2010/0114868 A1 * | 5/2010 | Beavin | G06F 17/30463 |
| | | | 707/718 |
| 2011/0055201 A1 | 3/2011 | Burger | |

FOREIGN PATENT DOCUMENTS

| | | | | |
|---|---|---|---|---|
| CN | 103810212 A | | 5/2014 | |
| CN | 102799514 B | * | 2/2017 | H04L 41/069 |

OTHER PUBLICATIONS

ORACLE®, "The Query Optimizer" Chapter 13, Oracle® Database, Performance Tuning Guide, 10 g Release 2 (10.2), Mar. 2008, pp. 13-1-13-30.
Voigt et al., "Adaptive Index Buffer", 2012 IEEE 28th International Conference on Data Engineering Workshops, pp. 308-314.
CN Application No. 201410690310.0, Filed Nov. 25, 2014, entitled: "Generating Index for Table in Database", pp. 1-33.

* cited by examiner

210 Table : T1

| ID | Year | Month | Production | ... |
|---|---|---|---|---|
| 1 | 2014 | 09 | 100 | ... |
| ... | ... | ... | ... | ... |
| 9 | 2014 | 01 | 105 | ... |
| 10 | 2013 | 12 | 110 | ... |
| ... | ... | ... | ... | ... |
| 21 | 2013 | 01 | 105 | ... |
| ... | ... | ... | ... | ... |

To-be-archived Data: rows with Year = 2013

220 Table : T1

| ID | Year | Month | Production | ... |
|---|---|---|---|---|
| 1 | 2014 | 09 | 100 | ... |
| ... | ... | ... | ... | ... |
| 9 | 2014 | 01 | 105 | ... |
| ... | ... | ... | ... | ... |

230 Table : T2

| ID | Year | Month | Production | ... |
|---|---|---|---|---|
| 1 | 2013 | 12 | 110 | ... |
| ... | ... | ... | ... | ... |
| 12 | 2013 | 01 | 105 | ... |

INSERT INTO T2 (SELECT * FROM T1 WHERE YEAR = '2013')

SQL1: SELECT * FROM T1 WHERE YEAR ='2013'

SQL2: DELETE FROM T1 WHERE YEAR ='2013'

210 Table : T1

| ID | Year | Month | Production | ... |
|---|---|---|---|---|
| 1 | 2014 | 09 | 100 | ... |
| ... | ... | ... | ... | ... |
| 9 | 2014 | 01 | 105 | ... |
| 10 | 2013 | 12 | 110 | ... |
| ... | ... | ... | ... | ... |
| 21 | 2013 | 01 | 105 | ... |
| ... | ... | ... | ... | ... |

310

320 Result List :

| 10 | 11 | ... | 21 |
|---|---|---|---|

GENERATING AN INDEX FOR A TABLE IN A DATABASE BACKGROUND

The present invention relates generally to the field of database management, and more particularly to generating an index for a table in a database.

With the development of data storage technology, significant improvement have been made to the storage capacity of database systems, and many lines of records can be stored in one table of a database. Generally, the efficiency of querying a table in the database depends on the time needed for scanning the table. As data table size ever increase, increasing the database's efficiency in responding to data query statements and other data processing statements becomes advantageous.

Indexes help to increase the efficiency of data query statements, and various technical solutions for building indexes in databases have been proposed. However, it can be appreciated that, indexes can increase the efficiency of data queries, but excessive indexes may greatly reduce the efficiency of other operations, for example, modifications such as insertion and deletion, to the data table. Therefore is it advantageous to manage the number of indexes in database management so as to avoid a too low efficiency of modification.

SUMMARY

Embodiments of the present invention disclose a method, computer program product, and system for generating an index for a table in a database. A query statement to query a table is received, the table for a plurality of lines that satisfy a query condition in the query statement is searched for, a result list based on identifiers of one or more lines in the plurality of lines is generated, and an index for the query statement is generated, wherein the index comprises information associated with the result list and the query condition. The query condition and the identifier of the table is extracted from the query statement, and the index is generated based on the query condition, the identifier of the table, and the result list. A hash value of the identifier of the table and the query condition is obtained, an association between the hash value and the result list to build the index is generated, and in response to a line of the plurality of lines in the table being modified, the index identified as invalid. The result list is released.

Various embodiments disclose a method, computer program product, and system for manipulating a table in a database based on an index. A query condition and a result list from the index is parsed, in response to receiving a second statement to manipulate the table, the query condition determining to match at least one part of a second condition in the second statement; and the second statement based on a plurality of lines in the table is executed, which are indicated by identifiers in the result list. In response to the query condition matching the second condition, an operation in the second statement which indicates identifiers in the results list is executed, within the plurality of lines in the table. In response to the query condition matching one part of the second condition, at least one line that satisfies the second condition is searched for among the plurality of lines in the table which are indicated by identifiers in the result list, and an operation in the second statement with where at least one line of the plurality of lines is found is executed.

The query statement and the second statement in one transaction of the database is committed.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which:

FIG. 2 is a functional block diagram illustrating a data archiving operation of a technical solution, in accordance with an embodiment of the present invention.

FIG. 3 depicts a functional block diagram illustrating a technical solution for generating an index for a table in a database, in accordance with an embodiment of the present invention.

DETAILED DESCRIPTION

Figure 1:
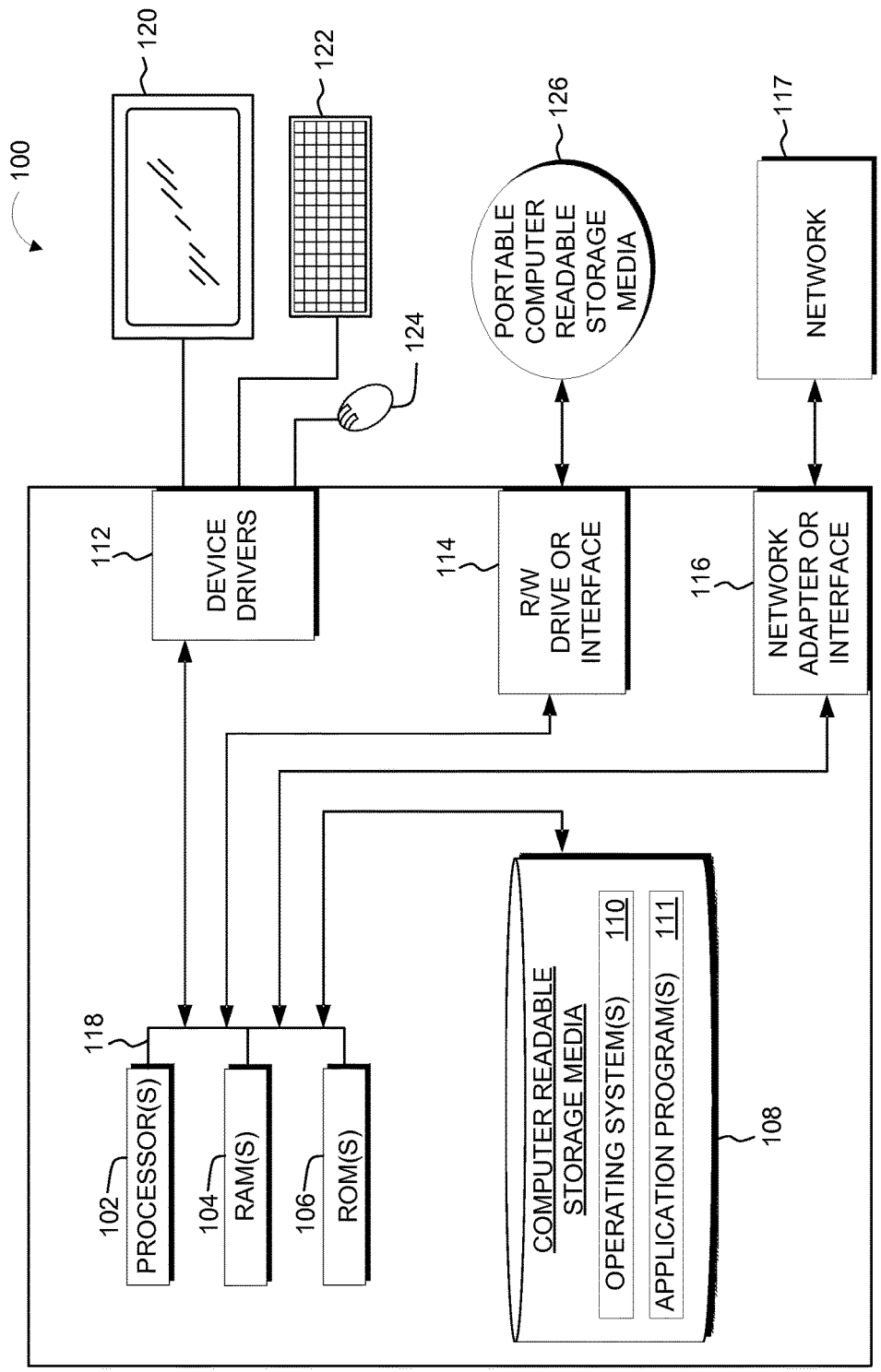
FIG. 1 depicts a functional block diagram of components of a computer device implementing embodiments of the present invention.

It may be desirable to develop a technical solution capable of effectively managing a database system, and increase response efficiency of the database system. The solution may be compatible with an existing database system in order to increase the response efficiency of a query statement and other data processing statements of the database without changing resource configuration in the existing database system.

In one embodiment of the present invention, an index may be generated for a table in a database, comprising: searching in the table for one or more lines that satisfy a query condition in the query statement, in response to receiving a query statement to query the table; building a result list based on identifiers of the one or more lines; and generating the index for the query statement, the index comprising information associated with the result list and the query condition.

In one embodiment of the present invention, a query condition and result list may be parsed from an index; in response to receiving a second statement to manipulate the table, a query condition may be determined to match at least one part of a second condition in the second statement; and the second statement based on one or more lines in the table may be executed, which may be indicated by identifiers in the result list.

In one embodiment of the present invention, an apparatus, or computer system, for generating an index for a table in a database may comprise a search module configured to, in response to receiving a query statement to query the table, search in the table for one or more lines that satisfy a query condition in the query statement; a building module configured to build a result list based on identifiers of the one or more lines; and a generating module configured to generate the index for the query statement, the index comprising information associated with the result list and the query condition.

In one embodiment of the present invention, an apparatus, or computer system, for manipulating a table in a database based on an index may comprise a parsing module configured to parse a query condition and a result list from the index; a determining module configured to, in response to receiving a second statement to manipulate the table, determine the query condition matches at least one part of a second condition in the second statement; and an executing module configured to execute the second statement based on one or more lines in the table which are indicated by identifiers in the result list.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention will be described with reference to the Figures. Referring to FIG. 1, FIG. 1 depicts a functional block diagram of components of an exemplary computer device, generally designated computing device 100, implementing embodiments of the present invention.

It should be appreciated that FIG. 1 provides only an illustration of one implementation and does not imply any limitations with regard to the environments in which different embodiments may be implemented. Many modifications to the depicted environment may be made.

Computing device 100 may include one or more processors 102, one or more computer-readable RAMs 104, one or more computer-readable ROMs 106, one or more computer readable storage media 108, device drivers 112, read/write drive or interface 114, network adapter or interface 116, all interconnected over a communications fabric 118. Communications fabric 118 may be implemented with any architecture designed for passing data and/or control information between processors (such as microprocessors, communications and network processors, etc.), system memory, peripheral devices, and any other hardware components within a system.

One or more operating systems 110, and one or more application programs 111 are stored on one or more of the computer readable storage media 108 for execution by one or more of the processors 102 via one or more of the respective RAMs 104 (which typically include cache memory). In the illustrated embodiment, each of the computer readable storage media 108 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 100 may also include a R/W drive or interface 114 to read from and write to one or more portable computer readable storage media 126. Application programs 111 on computing device 100 may be stored on one or more of the portable computer readable storage media 126, read via the respective R/W drive or interface 114 and loaded into the respective computer readable storage media 108.

Computing device 100 may also include a network adapter or interface 116, such as a TCP/IP adapter card or wireless communication adapter (such as a 4G wireless communication adapter using OFDMA technology) for connection to a network 117. Application programs 111 on computing device 100 may be downloaded to the computing device from an external computer or external storage device via a network (for example, the Internet, a local area network or other wide area network or wireless network) and network adapter or interface 116. From the network adapter or interface 116, the programs may be loaded onto computer readable storage media 108. The network may comprise copper wires, optical fibers, wireless transmission, routers, firewalls, switches, gateway computers and/or edge servers.

Computing device 100 may also include a display screen 120, a keyboard or keypad 122, and a computer mouse or touchpad 124. Device drivers 112 interface to display screen 120 for imaging, to keyboard or keypad 122, to computer mouse or touchpad 124, and/or to display screen 120 for pressure sensing of alphanumeric character entry and user selections. The device drivers 112, R/W drive or interface 114 and network adapter or interface 116 may comprise hardware and software (stored on computer readable storage media 108 and/or ROM 106).

Computing device 100 may be a laptop computer, tablet computer, netbook computer, personal computer (PC), a desktop computer, a smart phone, or any programmable electronic device capable of communicating with other computing devices, not shown, via network 117.

While manipulating a database, various types of processing operations may be involved, for example, lines satisfying certain query conditions may be queried in a table of a database by using query statements (e.g., querying the output of each month in the year 2013 in a table that records production statuses of a factory), or the production of a specific month (e.g., August) in the year 2013 may be queried in this table, etc. Since the data table may comprise many lines of records, it may take a significant amount of time to run a full scan on the data table so as to obtain a query result, which greatly affects the database's response speed.

Additionally, lines satisfying certain conditions may be deleted from tables of a database by using a delete statement (for example, all records of the production in the year 2013 may be deleted from the above mentioned example table). Record deletion may comprises two steps: first, scanning the table to obtain lines that satisfy conditions, and then deleting these lines from the data table. It can be appreciated that, with traditional technical solutions, massive operations to a data table may directly or indirectly involve a table scan, so responses times of database systems may be.

In reference to FIG. 2, FIG. 2 is a functional block diagram illustrating a data archiving operation of a technical solution, in accordance with an embodiment of the present invention. While archiving data in the data table, drawbacks may exist in traditional technical solutions. Data archiving refers to the process of migrating data that is not used frequently to a separate storage space (e.g., another data table) for storage. FIG. 2 schematically shows a block diagram 200 of data archiving operation according to an exemplary embodiment. A table 210 shows a data table T1 for storing the production of each month of a factory. Data table T1 comprises a plurality of columns: a column "ID" for storing an identifier of each line of records, a column "Year" and a column "Month" for storing years and months respectively, a column "Production" for storing the production of a specified year and month, etc.

Records in the data table T1 may increase with the passage of time. As a result, the response time for operations to the data table T1 may increase. Therefore, the database administrator may migrate data of the earlier years (e.g., 2013) from the data table T1 to other data table for storage, and this migration may be called data archiving. As shown in FIG. 2, data archiving may be implemented using the illustrated SQL statement "INSERT INTO T2 (SELECT*FROM T1 WHERE YEAR='2013')". This SQL statement means: first determine which data in the data table T1 relates to 2013, and then copy to another data table (e.g., a table T2 denoted by a reference numeral 230) which records that result from the query. By executing this statement, data in 2013 may be archived to the data table T2, and then archived data may be deleted from T1 by an SQL "DELETE FROM T1 WHERE YEAR='2013'" resulting in data a modified table T1 as denoted by reference numeral 220.

Those skilled in the art may appreciate that during the above data archiving process, two SQL statements may execute table scans on the table T1, so the table scan is twice triggered by the two SQL statements and may result in an increase in time and decrease in the efficiency of data archiving. It may be appreciated that, although in the context of the present invention a data table for storing production data in each month is taken as an example (at this point, the data table only comprises dozens of lines of records), in specific application environments, for example a data table for recording status at each second of a power grid, may comprise millions of lines of records or more. This may cause the latency of data archiving for the data table to become time or resource prohibitive.

In various embodiments, while the database system is running, the data archiving operation may involve the above described "repetitive table scan," and the query-delete operation shown below may lead to "repetitive table scan" as well. An example of a query statement SQL1 and a delete statement SQL2 are shown as below:

SQL1: SELECT*FROM T1 WHERE YEAR='2013'
SQL2: DELETE FROM T1 WHERE YEAR='2013'

The duration of time it takes to perform a table scan may be an important indicator that affects the database's response efficiency. It may be desirable to reduce the number of table scans that occur. In various embodiments of the present invention a method may generating an index for a table in a database. In response to receiving a query statement to query the table, a table may be searched for one or more lines that satisfy a query condition in the query statement. A result list may be generated based on identifiers of the one or more lines; and an index may be generated for the query statement. The index may comprise information associated with the result list and the query condition.

In various embodiments of the present invention, a query condition and a result list may be returned by the query and be stored in an index in memory. If a subsequent operation relates to the same or similar condition, the result list in the index may be used directly, rather than executing a table scan on the entire data table. In various embodiments, the similar condition means that the query condition in the query statement matches at least one part of another condition in a subsequent operation, to be discusses in detailed with reference to FIGS. 6 and 7 below.

Referring to FIG. 3, FIG. 3 depicts a functional block diagram illustrating a technical solution for generating an index for a table in a database, generally designated 300, in accordance with an embodiment of the present invention. In various embodiments of the present invention, both SQL1 and SQL2 are executed during data archiving, for example, a query result of executing SQL1 may be depicted in a block 310. During the execution of SQL1, line identifiers of records that satisfy a query condition in SQL1 may be stored, for example, resultant line identifiers (e.g., 10, 11, . . . , 21) resulting from the query may be stored in a result list 320.

In various embodiments, the data archiving operation described in reference to FIG. 2 above, while deleting archived data, the table scan does not need to be executed once more, but records recorded in the result list in the index obtained from executing SQL1 can be deleted directly. Lines in the table T1 with identifiers 10, 11, . . . , 21 can be deleted directly without a need to execute table scan once more, which may increase the database's response speed.

Figure 4:
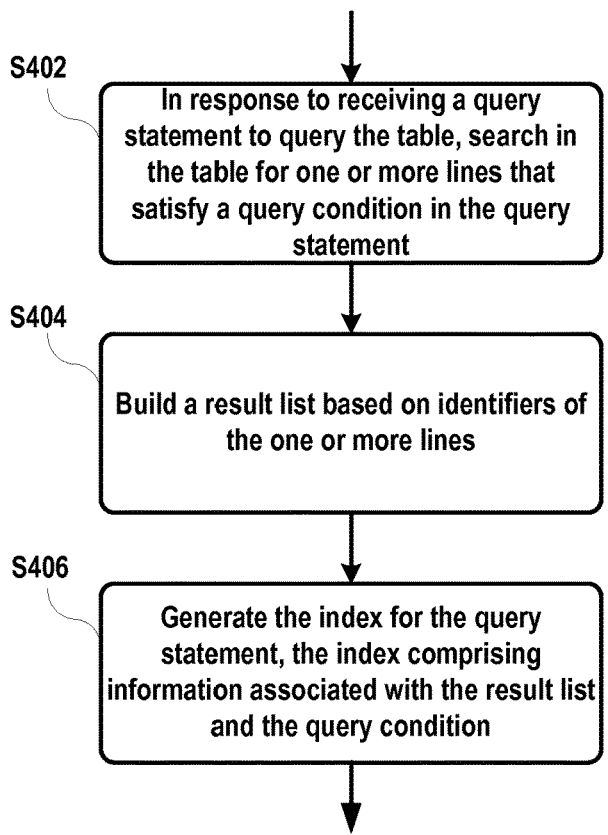
FIG. 4 is a flowchart depicting operational steps of a method for generating an index for a table in a database, in accordance with an embodiment of the present invention.

Referring to FIG. 4, FIG. 4 is a flowchart, generally designated 400, depicting operational steps of a method for generating an index for a table in a database, in accordance with an embodiment of the present invention. In step S402, in response to receiving a query statement to query the table, one or more lines that satisfy a query condition in the query statement are searched for in the table. In various embodiments, the above query statement SQL1: SELECT*FROM T1 WHERE YEAR='2013', may be executed in the database management system, so as to find in the data table T1 multiple lines (i.e., lines with identifiers of 10, 11, . . . , 21) that satisfy the query condition "YEAR='2013.'"

In step S404, a result list is built based on identifiers of the one or more lines. In this step, the found identifiers of multiple lines may be stored using an array. For example, an array result_list (10, 11, . . . , 21) may be used, wherein the array result_list may comprise 12elements, each of which represents an identifier of a line where data in each month of 2013 is populated. In one embodiment of the present invention, the content of a primary key of the data table T1 may be used as the identifier.

In step S406, the index is generated for the query statement. The index comprises information associated with the result list and the query condition. Step S406 is not intended to limit the manner in which the information associated with the result list and the query condition may be stored in the index. For example, in an embodiment, the query condition "YEAR='2013'" and the array result_list (10, 11, . . . , 21) may be directly stored in the index. Alternatively, if the number of lines returned by the query is larger than a threshold value as appreciated by those skilled in the art, the array result_list (10, 11, . . . , 21) may further be compressed, or a format of the result list may be set using various data storage techniques that are currently known or to be developed later.

In various embodiments, the index generated is an index for the query statement. For example, by storing the query result in the index and the query condition associated with the query statement, target data can be directly accessed via the query result stored in the index without a need to execute additional table scans, if a processing statement that is the same as or similar to the query condition in the query statement is executed later. This embodiment is not intended to limit how many indexes are generated for one table, but multiple indexes may be generated for one table. For example, when the database administrator uses SQL3 and SQL4 to archive data on the production in 2012, a corresponding index may be generated for the query statement SQL3 shown below:

SQL3: SELECT*FROM T1 WHERE YEAR='2012'
SQL4: DELETE FROM T1 WHERE YEAR='2012'

When archived data is deleted from the data table T1 by using SQL4, there may be no need to execute an additional table scan.

The above embodiment is illustrated by means of only one data table in a database. In various embodiments of the present invention, it is not intended to limit that an index is generated for one data table, but when the database comprises a plurality of data tables, a corresponding index may further be generated based on a query statement executed on a different data table.

In one embodiment of the present invention, the index further comprises information associated with an identifier of the table in that each index identifies an associated table. It may be appreciated that, in the embodiment of the present invention, corresponding indexes may be generated for a plurality of query statements, and these query statements may be query statements that are executed on the same or different data tables.

In an embodiment of the present invention, the generated index for the query statement extracts a query statement, a query condition, and an identifier of the table. An index is built based on the query condition, where the identifier of the table includes the result list. In this embodiment, due to the syntactic structure of the query statement may be already learned, the query condition and the identifier of the table may be extracted from the query statement. For example, the query statement SQL1: SELECT*FROM T1 WHERE YEAR='2013', may be found by analyzing the structure of the query statement that the keyword "WHERE" is followed by the query condition "YEAR='2013'", while the keyword "FROM" is followed by the identifier "T1" of the table. Similarly, those skilled in the art may further extract information from other query statements having a more complex structure based on the foregoing principle. For example, regarding a query statement below:

SQL5: SELECT*FROM T2 WHERE YEAR='2013' AND MONTH='12'

In various embodiments the query condition of SQL5 may be "YEAR='2013' AND MONTH='12'", and the identifier of the table may be "T2". In SQL5, the query condition involves two conditions, namely "YEAR='2013'" and "MONTH='12'".

In one embodiment of the present invention, an index may be built based on the query condition where the identifiers of the table result in a list. The list may include an obtained hash value of the identifier of the table and the query condition. An association relationship may be generated between the hash value and the result list so as to be build the index.

It may be appreciated by those in the art that the query statements illustrated above are simple query statements.

Those skilled in the art may note in actual operations to the database, a query statement might involve a plurality of complex query conditions. Therefore, when generating an index, a hash value of the identifier of the table and the query condition may be obtained according to a predefined hash function, and an association relationship between the hash value and the result list may be created to build an index. Using the hash value, space occupied by the identifier of the table and the query condition in the index may be reduced.

In above embodiments of the present invention are not intended to be limiting in which format the index is stored. Those skilled in the art may customize data structure of the index according to demands of specific application environment, so long as the index comprises information associated with the result list and the query condition.

Figure 5A:
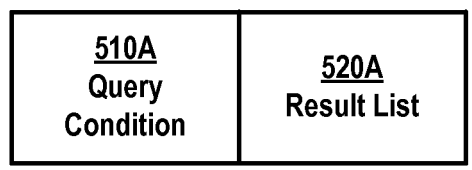
FIGS. 5A, 5B, and 5C are functional block diagrams illustrating the data structure of an index, in accordance with an embodiment of the present invention.
Figure 5B:
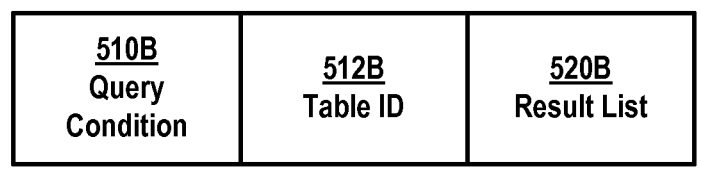
Figure 5C:
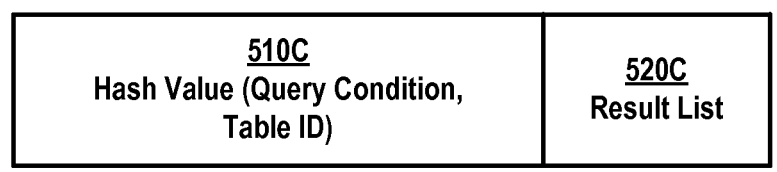

Referring to FIGS. 5A, 5B, and 5C. FIGS. 5A, 5B, and 5C are functional block diagrams of data structures 500A, 500B, and 500C, of an index, in accordance with an embodiment of the present invention. Referring now to FIG. 5A, the index may be stored in a data structure. Index 500A may comprise a query condition 510A and a result list 520A. Regarding SQL1 shown above, the index may be represented as:

Index 1: (YEAR='2013'; result_list(10, 11, . . . , 21))

In various embodiments, the index may be stored in data structure 500B, illustrated in FIG. 5B, and may comprise a query condition 510B, a table ID 512B and a result list 520B. Regarding SQL1 shown above, the index may be represented as:

Index 2: (YEAR='2013'; T1; result_list(10, 11, . . . , 21))

In various embodiments, the index may be stored in data structure as 500C, illustrated in FIG. 5C, which may comprise a hash value 510C of the table ID and the query condition, and a result list 520C. Regarding SQL1shown above, the index may be represented as:

Index 3: (hash(YEAR='2013', T1); result_list(10, 11, . . . , 21))

In Index 1 to Index 3 shown above, when the result list comprises identifiers of a large amount of lines, the resulting list may further be compressed to save storage space. Those skilled in the art may appreciate that since the index only records the identifier of a line that satisfies the query condition, but does not store specific data in the line, the generated index is not always valid. When data in record lines indicated by the result list in the index is updated, these record lines may no longer satisfy the query condition, so a subsequent data processing statement my re-execute the table scan.

In one embodiment of the present invention, an index may be identified as invalid, in response to any line in the table being modified. Various approaches to identifying the index as invalid may be used, for example, in an index, a flag may be used to indicate whether the index is valid. Initially, the flag may be set as "TRUE" to indicate the index is valid, however, when any line in the table is indicated by the result list as modified, the flag may be set as "FALSE," indicating the index is invalid. This may avoid an index that is no longer accurate from being used in a subsequent operation and further errors to be caused in the database.

In one embodiment of the present invention, the result list may be released. Since the result list might occupy a large storage space, when it is determined the index is invalid, the result list may be released so as to obtain more storage space.

It may be appreciated by one in the art that generating the index, when subsequently executing a processing statement that is the same as or similar to the query condition in the query statement, may result in one or more columns that satisfy the query condition and may be directly obtained via the index without a need to re-execute table scan on the data table, thereby increasing the database's response speed.

In various embodiments of the present invention, a table in a database based on an index, may be manipulated. A query condition and a result list from the index may be parsed. A query condition that matches at least one part of a second condition in the second statement may be determined, in response to receiving a second statement to manipulate the table. The second statement may be executed based on the one or more lines in the table which are indicated by identifiers in the results list.

Figure 6:
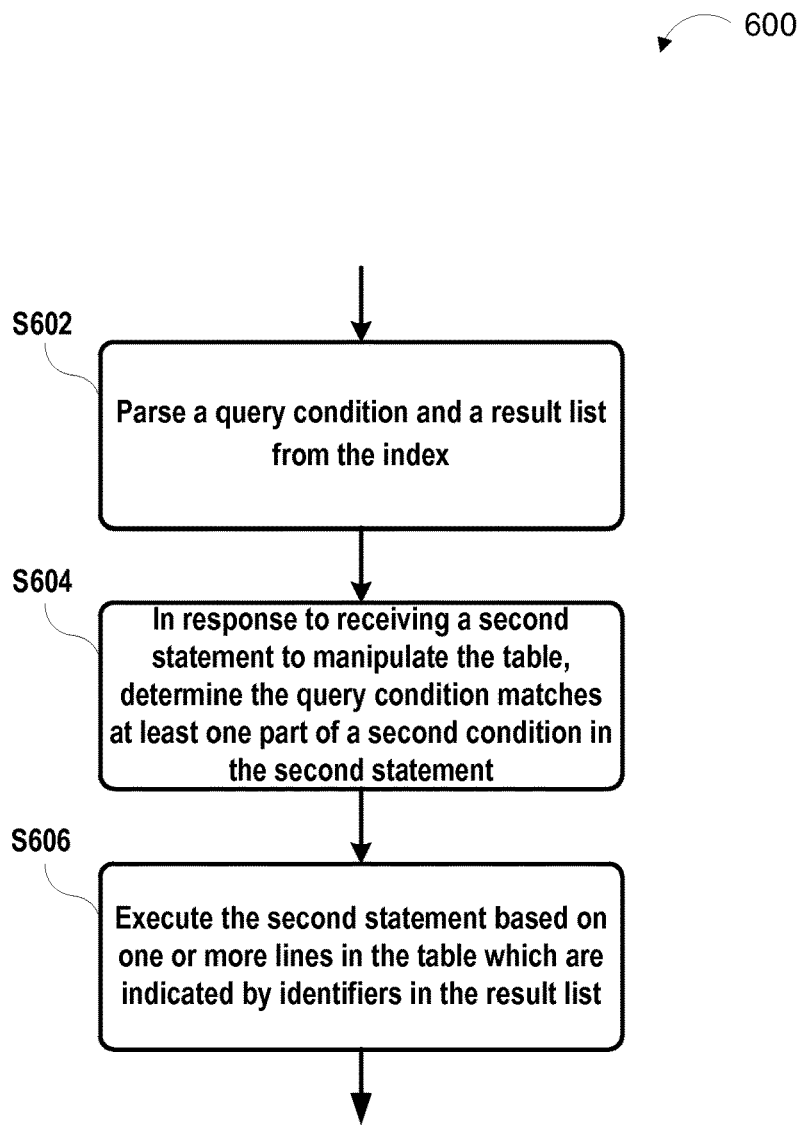
FIG. 6 is a functional block diagram of a method for manipulating a table in a database based on an index, in accordance with an embodiment of the present invention.

Now referring to FIG. 6, FIG. 6 is a functional block diagram of a method for manipulating a table in a database based on an index, in accordance with an embodiment of the present invention. FIG. 6 illustrated flowchart 600 of a method for manipulating a table in a database based on an index according to one embodiment of the present invention. In step S602, a query condition and a result list are parsed from the index. This parsing step is an inverse operation of the generating step S406 in FIG. 4, for example, a method opposite to the generating step may be used to parse a query condition and a result list from the index.

For example, when using the data structure shown in FIG. 5A to generate an index, a query condition and a result list may be parsed from the index directly. For example, the query condition YEAR='2013' may be obtained directly from the foregoing Index 1, and the result list result_list (10, 11, . . . , 21) may be obtained. Those skilled in the art may appreciate that the query condition may be obtained and the result list from the index with data structure as shown in FIGS. 5B and 5C may be obtained, as described above.

In step S604, in response to receiving a second statement to manipulate the table, it is determined that the query condition matches at least one part of a second condition in the second statement. Those skilled in the art may appreciate that the result list obtained from the index can be used only when the query condition obtained from the index is the same as a second condition in the second statement or the query condition obtained from the index is a proper subset of a second condition in the second statement. In step S604, by determining that the query condition matches at least one part of the second condition in the second statement, the generated index may be used to help execute the second statement in a subsequent operation.

In step S606, the second statement is executed based on one or more lines in the table which are indicated by identifiers in the result list. In this step, when the query condition matches a second condition in the second statement, one or more lines that satisfy the second condition in the second statement may be found directly through the result list. Alternatively, when the query condition matches one part of the second condition in the second statement, one or more lines indicated by identifiers in the result list may be a superset of the record lines that satisfy the second condition in the second statement. By scanning one or more lines, record lines that satisfy the second condition in the second statement may be obtained. In this manner, target record lines may be obtained rapidly without a need to execute full table scan on the data table. In step S606, the index may be an index generated by the method described with reference to FIG. 4 above.

It may be appreciated that, this embodiment only illustrates the circumstance where the index and the second statement involve the same data table. In various embodiments, the index and the second statement may involve different data tables and a table identifier may be parsed from the index. A table identifier in the second statement may be compared in order to determine whether the index and the second statement involve the same data table. After it is determined that the index and the second statement involve the same data table, the method shown in FIG. 6 may be executed.

In an embodiment of the present invention, in response to receiving a second statement to manipulate the table, a second table identifier from the second statement may be extracted and a table identifier from the index may be parsed. In response to the second table identifier matching the table identifier, a query condition and a result list from the index may be parsed. The query condition may be determined to match at least one part of a second condition in the second statement and the second statement may be executed based on one or more lines in the table which are indicated by identifiers in the result list.

Figure 7:
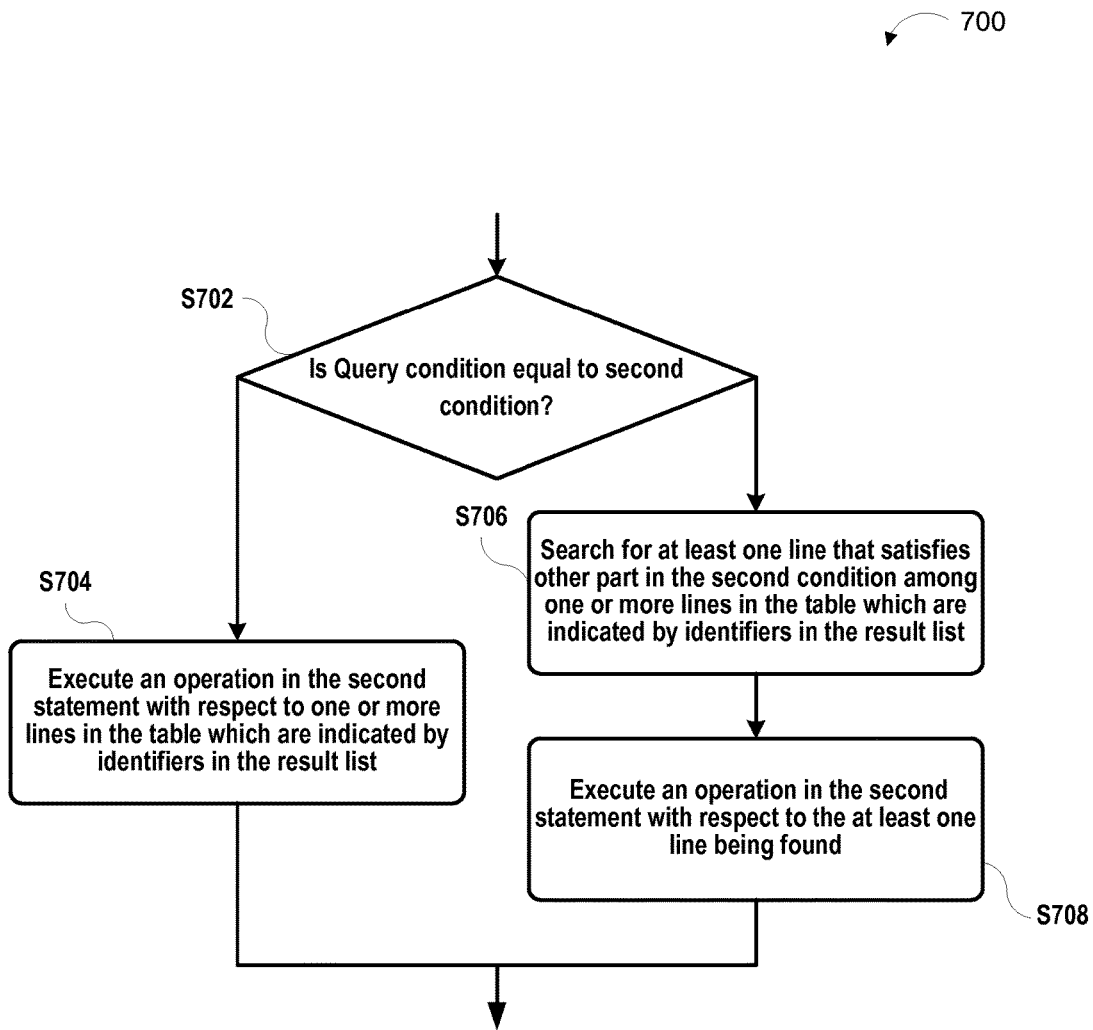
FIG. 7 is a flowchart depicting operational steps of a method for executing a second statement, in accordance with an embodiment of the present invention.

Referring to FIG. 7, generally designated flowchart 700, depicting operational steps of a method for executing a second statement, in accordance with an embodiment of the present invention. In step decision step S702, when a query condition equals a second condition, a branch shown by a step S704 is executed. When a query condition does not equal to a second condition but still within the subset of the second condition, a branch shown by steps S706-S708 is executed.

In one embodiment of the present invention, executing the second statement based on one or more lines in the table which are indicated by identifiers in the result list may comprise, executing an operation in the second statement based on one or more lines in the table which are indicated by identifiers in the result list, in response to the query condition matching the second condition.

In various embodiments, when the query condition matches the second condition, it may indicate that the query condition in the query statement, which serves as a basis of the index, is the same as the second condition in the second statement. The second statement may be executed directly with respect to the one or more lines indicated by identifiers in the result list. For example, the database administrator may execute a set of SQL statements shown by Table 1 below:

TABLE 1

Example of SQL Statement

| No. | SQL Statement |
|---|---|
| 1 | SELECT * FROM T1 WHERE YEAR = '2013' |
| 2 | DELETE FROM T1 WHERE YEAR = '2013' |
| . . . | . . . |

The two statements may have the same condition, i.e., "YEAR='2013'", such that one or more lines may indicate by identifiers in the result list may be deleted from Table 1. In this embodiment, there is no need to execute a table scan within the entire data table as performed in the prior art. Thereby, the database's response speed may be increased.

In one embodiment of the present invention, executing the second statement, based on one or more lines in the table, which are indicated by identifiers in the result list may comprise searching for at least one line that satisfies other part of the second condition among the one or more lines in the table which are indicated by identifiers in the result list, in response to the query condition matching one part of the second condition. In various embodiments an operation may be executed in the second statement with respect to the at least one line being found.

In an embodiment, the query condition in the index may be a subset of the second condition in the second statement, which point search may be conducted among one or more lines indicated by identifiers in the result list, so as to find record lines satisfying the second condition. For example, the database administrator may execute a set of SQL statements shown by Table 2 below:

TABLE 2

Example of SQL Statement

| No. | SQL Statement |
|---|---|
| 1 | SELECT * FROM T1 WHERE YEAR = '2013' |
| 2 | SELECT * FROM T1 WHERE YEAR = '2013' AND MONTH = '12' |
| ... | ... |

In an embodiment, record lines may satisfy the query condition "YEAR='2013'" as indicated by identifiers in the result list, i.e., 12 record lines about 12 months in the year 2013. As the second condition in the second statement further comprises "MONTH='12'", the data "MONTH='12'" may be looked up in the 12 record lines. In an embodiment, a search is conducted among only 12 record lines, rather than the table scan being executed within the entire data table, such that the search for data lines may satisfy both conditions "YEAR='2013'" and "MONTH='12.'"

In various embodiments of the present invention, the index may be generated manually or automatically. For example, a keyword "WITH PRIVATE INDEX" indicating the index may be generated manually may be defined, or the keywords may be added after a conventional query statement indicates the index is to be generated manually. Additionally, a manual trigger may be implemented to generate an index. In an embodiment, a keyword may be added at the end of a query statement to indicate the index is to be generated according to various embodiments of the present invention. For example, the index according to the present invention will be generated after SQL6 below executes a SELECT statement conventionally:

SQL6: SELECT*FROM T1 WHERE YEAR='2013' WITH PRIVATE INDEX

Alternatively, the index may be automatically generated, in response to determining the query condition in a previous query statement matches at least one part of the second condition in a subsequent second statement.

In one embodiment of the present invention, a query statement and a second statement may be performed in one transaction of the database. For example, the query statement and the second statement may be committed as codes shown in Table 3:

TABLE 3

Example of Committing Statements:

BEGIN TRANSACTION
SELECT * FROM T1 WHERE YEAR = '2013'
DELETE FROM T1 WHERE YEAR = '2013'
...
COMMIT TRANSACTION

It may be appreciated that, the present invention is not intended to be limited in the type of the second statement, for example, the second statement may be any one of a query statement, a delete statement or an update statement.

Those skilled in the art may appreciate that the method described herein may be implemented in software, hardware or a combination of these. Moreover, those skilled in the art may appreciate that by implementing steps in the above method in software, hardware or a combination of software and hardware, there may be provided an apparatus, or computer system, based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention comprises several means or modules, the means or modules configured to execute corresponding steps. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As detailed and complete description has been presented above, the apparatus is not detailed below.

Figure 8A:
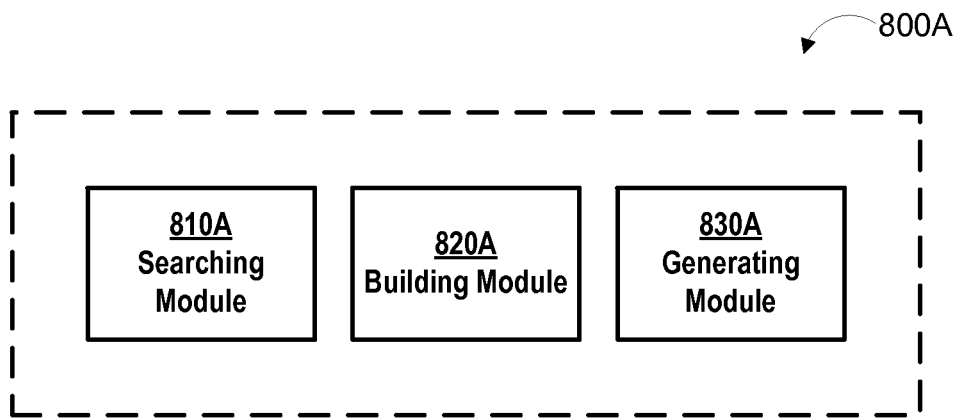
FIG. 8A is a functional block diagram illustrating the components of an application for generating an index for a table in a database.
Figure 8B:
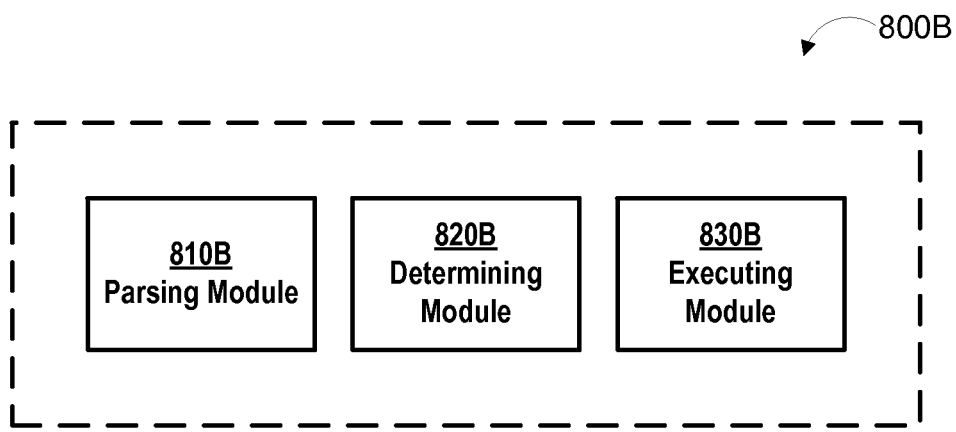
FIG. 8B is a functional block diagram illustrating the components of an application for manipulating a table in a database based on an index, in accordance with embodiments of the present invention.

Referring to FIG. 8, FIG. 8A is a functional block diagram illustrating apparatus or system 800A, for generating an index for a table in a database, and FIG. 8B is a functional block diagram illustrating the components of an apparatus or computer system 800B for manipulating a table in a database based on an index, in accordance with embodiments of the present invention.

In various embodiments, a search module 810A may be configured to, search in a table for one or more lines that satisfy a query condition in the query statement, in response to receiving a query statement to query the table. A building module 820A may be configured to build a result list based on identifiers of the one or more lines. Generating module 830A may be configured to generate the index for the query statement, the index comprising information associated with the result list and the query condition.

In one embodiment of the present invention, the index may comprises information associated with an identifier of the table. In one embodiment of the present invention, generating module 830A may comprise of an extracting module configured to extract the query condition and the identifier of the table from the query statement. Generating module 830A may create a module configured to build the index based on the query condition, the identifier of the table, and the result list, or creating module.

In various embodiments of the present invention, the creating module may comprise an obtaining module configured to obtain a hash value of the identifier of the table and the query condition, an index building module configured to create an association relationship between the hash value and the result list so as to build the index, an identifying module configured to identify the index as invalid, in response to any line among the one or more lines in the table being modified, or a releasing module configured to release the result list.

Now referring to FIG. 8B, FIG. 8B schematically shows a block diagram 800B of an apparatus, or system, for manipulating a table in a database based on an index according to one embodiment of the present invention. In various embodiments, an apparatus for manipulating a table in a database based on an index may comprise, a parsing module 810B configured to parse a query condition and a result list from the index, a determining module 820B configured to, in response to receiving a second statement to manipulate the table, determine the query condition matches at least one part of a second condition in the second statement, and an executing module 830B configured to execute the second statement based on one or more lines in the table which are indicated by identifiers in the result list.

In an embodiment of the present invention, executing module 830B may further comprises a first executing module configured to, in response to the query condition matching the second condition, execute an operation in the second statement with respect to the one or more lines in the table which are indicated by identifiers in the result list.

In one embodiment of the present invention, executing module 830B may further comprise a search module configured to, in response to the query condition matching one part of the second condition, search for at least one line that satisfies other part of the second condition among the one or more lines in the table which are indicated by identifiers in the result list, and a second executing module configured to execute an operation in the second statement with respect to the at least one line being found.

In various embodiment of the present invention, a committing module, within the apparatus, may be configured to commit the query statement and the second statement in one transaction of the database.

In various embodiments of the present invention, a "private" index may be created for a specified query statement, in which an index may comprise information associated with a query result and a query condition in the query statement. Further, when it is found later that a condition in other data processing statement is the same as or similar to the query condition in the query statement, there is no need to execute full table scan on the data table, but the query result in the index can be directly used to simplify executing steps of the other data processing statement, and further the database system's response efficiency can be increased.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented method for managing a database to increase response efficiency of a database system, the method comprising:
    receiving a query statement to query a table in the database, wherein the query statement includes a table identifier and a query condition;
    searching the table identified by the table identifier for a plurality of lines that satisfy the query condition in the query statement;
    generating a result list based on line identifiers of one or more lines in the plurality of lines that satisfy the query condition;
    generating a hash value based on the table identifier and the query condition, wherein the hash value is associated with the line identifiers of the result list;
    generating a flag associated with a line validity state associated with line modification, wherein an initial condition of the validity state indicated by the flag is valid;
    mapping the flag to each line identifier of the generated result list;
    generating an index for the query statement, wherein the index comprises one or more lines in the plurality of lines associated with the results list and information associated with the result list and the query condition, the hash value, and the mapped flag, wherein the number of lines associated with the result list is compressed using a data storage technique when the number of lines is larger than a pre-configured threshold value, wherein the index is manually generated when a keyword is added at the end of the query statement to indicate the index is to be generated manually or the index is automatically generated in response to determining the query condition in a previous query statement matches at least one part of the second condition in a subsequent second statement; and
    using the generated index to respond to a received data query statement querying data in the database.

2. The method of claim 1, wherein the index further comprises information associated with an identifier of the table.

3. The method of claim 2, wherein generating the index for the query statement further comprises:
    extracting from the query statement, the query condition and the identifier of the table; and
    building the index based on the query condition, the identifier of the table, and the result list.

4. The method of claim 1, further comprising:
    in response to a line of the plurality of lines in the table being modified, setting the flag as false and identifying the index previously generated as invalid.

5. The method of claim 4, further comprising: releasing the result list when it is determined the index is invalid because any line among the one or more lines in the table is modified.

6. The method of claim 1, further comprising:
    manipulating the table based on the generated index, the manipulating the table based on the generated index, further includes:
        parsing the query condition and generated result list from the index;
        in response to receiving a second statement to manipulate the table, determining the query condition that matches at least one part of a second condition in the second statement; and
        executing the second statement based on a plurality of lines in the table, which are indicated by identifiers in the result list.

7. The method of claim 6, wherein executing the second statement based on the plurality of lines in the table, which are indicated by identifiers in the result list further comprises:
    in response to the query condition matching the second condition, executing an operation in the second statement which indicates identifiers in the results list, within the plurality of lines in the table.

8. The method of claim 6, wherein executing the second statement further comprises:
in response to the query condition matching one part of the second condition, searching for at least one line that satisfies the second condition, among the plurality of lines in the table which are indicated by identifiers in the result list; and
executing an operation in the second statement with where at least one line of the plurality of lines is found.

9. The method of claim 6, further comprising, committing the query statement and the second statement in one transaction of the database.

10. A computer system for managing a database to increase response efficiency of a database system, the computer system comprising:
one or more computer processors;
a computer-readable storage media;
program instructions stored on the computer-readable storage media for execution by at least one of the one or more processors, the program instructions comprising:
in response to receiving a query statement to query the table in the database, wherein the query statement includes a table identifier and a query condition, executing instructions to search the table identified by the table identifier for a plurality of lines that satisfy the query condition in the query statement;
instructions to generate a result list based on line identifiers of the one or more lines in the plurality of lines that satisfy the query condition;
instructions to generate a hash value based on the table identifier and the query condition, wherein the hash value is associated with the line identifiers of the result list;
instructions to generate a flag associated with a line validity state associated with line modification, wherein an initial condition of the validity state indicated by the flag is valid;
instructions to map the flag to each line identifier of the generated result list;
instructions to generate the index for the query statement, wherein the index comprises one or more lines in the plurality of lines associated with the results list and information associated with the result list and the query condition, the hash value, and the mapped flag, wherein the number of lines associated with the result list is compressed using a data storage technique when the number of lines is larger than a pre-configured threshold value, wherein the index is manually generated when a keyword is added at the end of the query statement to indicate the index is to be generated manually or the index is automatically generated in response to determining the query condition in a previous query statement matches at least one part of the second condition in a subsequent second statement; and
instructions to use the generated index to respond to a received data query statement querying data in the database.

11. The system of claim 10, wherein the index further comprises information associated with an identifier of the table.

12. The system of claim 11, wherein instructions to generate further comprises:
instructions to extract from the query statement, the query condition and the identifier of the table; and
instructions to build the index based on the query condition, the identifier of the table and the result list.

13. The system of claim 10, further comprising:
in response to any line among the one or more lines in the table being modified, instructions to set the flag as false and instructions to identify the index previously generated as invalid.

14. The system of claim 13, further comprising:
instructions to release the result list when it is determined the index is invalid because any line among the one or more lines in the table is modified.

15. The system of claim 10, further comprising:
instructions to manipulate the table based on the generated index, the instructions to manipulate the table based on the generated index, further includes:
instructions to parse the query condition and generated result list from the index;
in response to receiving a second statement to manipulate the table, instructions to determine the query condition that matches at least one part of a second condition in the second statement; and
instructions to execute the second statement based on a plurality of lines in the table, which are indicated by identifiers in the result list.

16. The system of claim 15, wherein instructions to execute the second statement based on the plurality of lines in the table, which are indicated by identifiers in the result list further comprises:
in response to the query condition matching the second condition, instructions to execute an operation in the second statement which indicates identifiers in the results list, within the plurality of lines in the table.

17. The system of claim 15, wherein the instructions to execute the second statement further comprises:
in response to the query condition matching one part of the second condition, instructions to search for at least one line that satisfies the second condition, among the plurality of lines in the table which are indicated by identifiers in the result list; and
instructions to execute an operation in the second statement with where at least one line of the plurality of lines is found.

18. A computer program product for managing a database to increase response efficiency of a database system, the computer program product comprising:
one or more non-transitory computer-readable storage media and program instructions stored on the one or more computer-readable storage media, the program instructions comprising:
in response to receiving a query statement to query the table in the database, wherein the query statement includes a table identifier and a query condition, executing instructions to search the table identified by the table identifier for a plurality of lines that satisfy the query condition in the query statement;
instructions to generate a result list based on line identifiers of the one or more lines in the plurality of lines that satisfy the query condition;
instructions to generate a hash value based on the table identifier and the query condition, wherein the hash value is associated with the line identifiers of the result list;
instructions to generate a flag associated with a line validity state associated with line modification, wherein an initial condition of the validity state indicated by the flag is valid;
instructions to map the flag to each line identifier of the generated result list;

instructions to generate the index for the query statement, wherein the index comprises one or more lines in the plurality of lines associated with the results list and information associated with the query condition, the hash value, and the mapped flag, wherein the number of lines associated with the result list is compressed using a data storage technique when the number of lines is larger than a pre-configured threshold value, wherein the index is manually generated when a keyword is added at the end of the query statement to indicate the index is to be generated manually or the index is automatically generated in response to determining the query condition in a previous query statement matches at least one part of the second condition in a subsequent second statement; and instructions to use the generated index to respond to a received data query statement querying data in the database.

\* \* \* \* \*